Patented Sept. 20, 1938

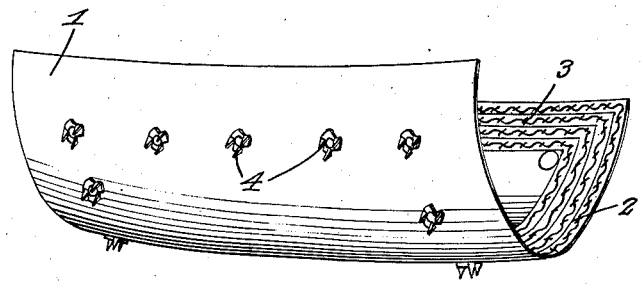
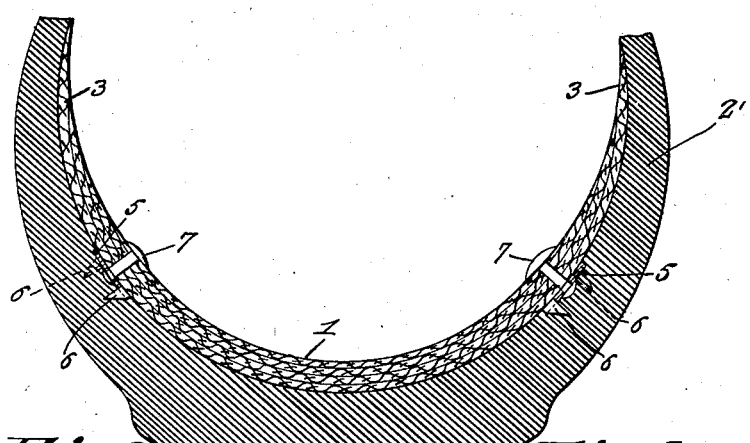
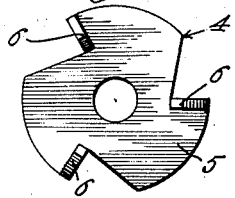
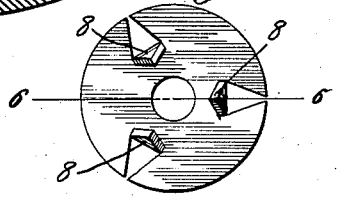
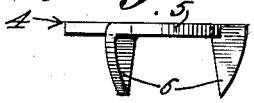

2,130,658

UNITED STATES PATENT OFFICE 2,130,658

TIRE PATCH

Harley Morton Watson, Omaha, Nebr.

Application July 21, 1936, Serial No. 91,734

1 Claim. (Cl. 152—367)

My invention relates to improvements in tire patches, or boots, for use in pneumatic tire casings.

The invention is designed with the particular purpose in view of providing an inexpensive, serviceable patch for quick attachment to the inner wall of the tire casing over blow-outs, punctures, and bruised or otherwise weakened portions of the casing and adapted to prevent the casing, under inflation pressure, from bulging throughout the zones weakened by such damage thereto.

Another object is to provide a device of the character and for the purpose above set forth embodying anchoring means to be driven into the tire casing and arranged to prevent that portion of the casing to which the patch is attached, from spreading either transversely or longitudinally so that said portion cannot bulge or flatten out under inflation pressure and the weight of the load thereon.

Other and subordinate objects, together with the exact nature of my improvements, will be clearly understood when the following description and claim are read with reference to the accompanying drawing.

In said drawing:

Figure 1 is a view in perspective of a tire patch embodying my improvements.

Figure 2 is a view in transverse section of a portion of a tire casing having my improved patch applied thereto.

Figure 3 is a view in bottom plan of a preferred form of anchoring device for the patch.

Figure 4 is a view in edge elevation of the same.

Figure 5 is a view in bottom plan of a modified form of anchoring device, and

Figure 6 is a view in transverse section taken on the line 6—6 of Figure 5.

Referring to the drawing by numerals, the patch of my invention comprises a body portion 1, rectangular in shape and form, of the usual laminated layers of cord fabric vulcanized into a unitary structure. Preferably the body portion 1 is curved longitudinally and transversely to conform with the curvature of the inner wall of a tire. The end and side edges of the body portion 1 are feathered or beveled, as at 2 and 3, respectively, so that they merge into the inner wall of a tire casing.

The body portion 1 is provided on the under side thereof with a plurality of anchoring devices 4 arranged in the form of a parallelogram including side and end rows parallel with the sides and ends 3 and 2 of said body portion and spaced at a suitable distance inwardly of said edges. The anchoring devices 4 comprise a disc-like head 5 and a plurality of sharp prongs 6 projecting from one side thereof at substantially right angles thereto. The anchoring devices 4 are secured to the body portion 1 by means of rivets 7 passing through the heads of said devices and of said body portion.

Preferably the devices 4 are formed of metal washers cut along non-radial lines at equidistantly spaced points around their outer edges to provide wedge-shaped edge prong portions struck up from said outer edge along lines radial to the axis of the washer.

In the modification shown in Figures 5 and 6 similar shaped prongs 8 are cut out of the edge of the washer, at equidistantly spaced intervals thereon, and bent up inwardly along lines transverse to the radial to space the prongs 8 inwardly of said edge.

The described patch is secured against the inner wall of the casing 2' by driving the devices 4 into said wall until the heads thereof are imbedded therein. In this position of said devices the portion of the tire casing within the confines of the parallelogram formed by said devices is held against spreading or creeping. The feathered edges 2 and 3 prevent the tire tube from being chafed by the patch. The patch may be cut or otherwise formed from old casings, thereby lessening the cost thereof.

The foregoing description will, it is believed, suffice to impart a clear understanding of my invention.

What I claim is:

A device for anchoring a tire patch to a tire casing comprising, a washer-like head incut at intervals around its outer edge along non-radial lines to provide edge prong portions thereon, said portions being struck up from said head along lines radial to the axis of the latter.

HARLEY MORTON WATSON.